(12) United States Patent
Morimoto

(10) Patent No.: US 9,635,327 B2
(45) Date of Patent: Apr. 25, 2017

(54) PROJECTOR, COLOR CORRECTION DEVICE, AND PROJECTION METHOD

(71) Applicant: NEC Display Solutions, Ltd., Tokyo (JP)

(72) Inventor: Takeshi Morimoto, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 30 days.

(21) Appl. No.: 14/780,998

(22) PCT Filed: Jan. 31, 2014

(86) PCT No.: PCT/JP2014/052236
§ 371 (c)(1),
(2) Date: Sep. 28, 2015

(87) PCT Pub. No.: WO2014/162768
PCT Pub. Date: Oct. 9, 2014

(65) Prior Publication Data
US 2016/0044290 A1 Feb. 11, 2016

(30) Foreign Application Priority Data

Apr. 5, 2013 (WO) .................. PCT/JP2013/060462

(51) Int. Cl.
*G03B 21/20* (2006.01)
*H04N 9/31* (2006.01)
(Continued)

(52) U.S. Cl.
CPC ........... *H04N 9/3164* (2013.01); *G03B 21/14* (2013.01); *G03B 33/08* (2013.01); *H04N 9/3182* (2013.01); *G03B 21/2013* (2013.01)

(58) Field of Classification Search
CPC G03B 21/2013; G03B 21/20; G03B 21/2033; G03B 21/202; G03B 21/2026;
(Continued)

(56) References Cited

U.S. PATENT DOCUMENTS 7,322,703 B2 * 1/2008 Matsui ................. G02B 26/008
348/743
2002/0154277 A1 * 10/2002 Mukawa .............. H04N 9/3164
353/31
(Continued)

FOREIGN PATENT DOCUMENTS

JP H 10-198795 A 7/1998
JP 2005-189472 A 7/2005
(Continued)

*Primary Examiner* — William C Dowling
*Assistant Examiner* — Ryan Howard
(74) *Attorney, Agent, or Firm* — McGinn IP Law Group, PLLC

(57) ABSTRACT

A light source unit emits a plurality of basic light beams of differing colors and a supplemental light beam of the same color as any of the colors of the plurality of basic light beams. A control unit (12), on the basis of an input picture signal that is received as input, supplies a first modulating signal for modulating each basic light beam that accords with the color of each pixel of an image indicated by the input picture signal and a second modulating signal for modulating the supplemental light beam in accordance with the specific color level in each pixel that indicates the degree of similarity between the color of the pixel and, of the colors of the plurality of basic light beams, a prescribed color that differs from the color of the supplemental light beam. Modulation units (108, 109, 110) modulate and emit the basic light beams in accordance with the first modulating signal and modulate and emit the supplemental light beam in accordance with the second modulating signal.

11 Claims, 10 Drawing Sheets

(51) Int. Cl.
*G03B 21/14* (2006.01)
*G03B 33/08* (2006.01)

(58) Field of Classification Search
CPC .. G03B 21/006; G03B 21/008; H04N 9/3164;
H04N 9/312; H04N 9/3182
USPC .......................................................... 353/94
See application file for complete search history.

(56) References Cited

U.S. PATENT DOCUMENTS

| | | | | |
|---|---|---|---|---|
| 2002/0186349 | A1* | 12/2002 | Wichner | H04N 9/315 |
| | | | | 353/29 |
| 2005/0013132 | A1* | 1/2005 | Kim | H04N 9/315 |
| | | | | 362/231 |
| 2012/0050693 | A1* | 3/2012 | Yanai | G03B 21/2013 |
| | | | | 353/31 |

FOREIGN PATENT DOCUMENTS

| | | |
|---|---|---|
| JP | 2005-321524 A | 11/2005 |
| JP | 2006-018162 A | 1/2006 |
| JP | 2007-228255 A | 9/2007 |
| JP | 2008-185992 A | 8/2008 |
| JP | WO 2011/037014 A1 | 3/2011 |

* cited by examiner

PROJECTOR, COLOR CORRECTION DEVICE, AND PROJECTION METHOD

TECHNICAL FIELD

The present invention relates to a projector that uses a light of a plurality of colors to project a color image.

BACKGROUND ART

In a projector that uses light of a plurality of colors to project a color image, the quantity of light of each color must be adjusted according to the human luminosity factor with respect to the light of each color and the optical output capability of the light sources that emit the light of each color to project an image with superior white balance. Problems therefore arise regarding both the inability to adequately exhibit the optical output capability for each color and the reduced brightness of white images.

For example, in the case of a projector that uses as a light source a plurality of LEDs that emit each of red light, green light, and blue light, according to the current state of the art, the performance of a green LED that emits green light is lowest and the performance of a blue LED that emits blue light is highest. As a result, the luminance of a blue LED must be eliminated in order to project an image of superior white balance.

Patent Document 1 discloses a projection-type display device that is provided with a supplemental green LED apart from the green LED that is used as the green light source that mixes green light with blue light. By using an LED array in which a supplemental green LED is aligned with a blue LED as the blue light source in this projection-type display device, green light is mixed with blue light. The quantity of green light can thus be increased, whereby an image can be projected with brighter white light and superior white balance without eliminating the luminance of the blue LED.

LITERATURE OF THE PRIOR ART

Patent Documents

Patent Document 1: International Patent No. 2011/037014

SUMMARY OF THE INVENTION

Problem to be Solved by the Invention

In the projection-type display device disclosed in Patent Document 1, however, not only blue light but also green light is emitted from the blue light source, and as a result, there is room for improvement with respect to color reproducibility.

FIGS. 1A and 1B are views for explaining the color reproducibility of the projection-type display device described in Patent Document 1.

More specifically, FIG. 1A is an xy chromaticity diagram that shows color gamut 1 of a projected image when only blue light is emitted from the blue light source, and FIG. 1B is an xy chromaticity diagram that shows color gamut 2 of a projected image when blue light and green light are emitted from the blue light source.

When only blue light is emitted from the blue light source, the color gamut of the projected image is spread wide as shown in color gamut 1 in FIG. 1A, but when blue light and green light are emitted from the blue light source, the region that displays blue is lost in the color gamut of the projected image as shown by color gamut 2 in FIG. 1B. As a result, when blue light and green light are emitted from the blue light source, even though a blue image is to be projected, in actuality, a cyan image is projected.

The present invention has its object providing a projector and a drive method of the projector that can solve the problem described above.

Means for Solving the Problem

The projector according to the present invention includes:

a light source unit that emits a plurality of basic light beams of different colors and a supplemental light beam of the same color as any of the colors of the plurality of basic light beams;

a control unit that, on the basis of an input picture signal that is received as input, supplies as output a first modulating signal for modulating each basic light beam according to the color of each pixel of images indicated by the input picture signal and a second modulating signal for, in each pixel, modulating the supplemental light beam according to a specific color level that indicates the degree of similarity between the color of the pixel and, from among the colors of the plurality of basic light beams, a prescribed color, that differs from the color of the supplemental light beam; and a modulation unit that modulates and emits each basic light beam according to the first modulating signal and modulates and emits the supplemental light beam in accordance with the second modulating signal.

The color correction device of the present invention is a color correction device that is used in a projector that is provided with: a light source unit that emits a plurality of basic light beams of different colors and a supplemental light beam of the same color as any of the colors of the plurality of basic light beams, and a modulation unit that modulates and emits each basic light beam in accordance with a first modulating signal for modulating each basic light beam and modulates and emits the supplemental light beam in accordance with a second modulating signal for modulating the supplemental light beam; the color correction device including:

a control unit that, based on an input picture signal that is received as input, supplies as output the first modulating signal that accords with the color of each pixel of an image indicated in the input picture signal and the second modulating signal that, in each pixel, accords with a specific color level that indicates the degree of similarity between the color of the pixel and, from among the colors of the plurality of basic light beams, a prescribed color, that differs from the color of the supplemental light beam.

The projection method of the present invention includes steps of:

emitting a plurality of basic light beams of different colors and a supplemental light beam of the same color as any of the colors of the plurality of basic light beams;

on the basis of on an input picture signal that is received as input, supplying as output a first modulating signal for modulating each basic light beam that accords with the color of each pixel of an image that is indicated in the input picture signal and a second modulating signal for, in each pixel, modulating the supplemental light beam that accords with a specific color level that indicates the degree of similarity between the color of the pixel and, from among the colors of the plurality of basic light beams, a prescribed color, that differs from the color of the supplemental light beam; and modulating and emitting each of the basic light beams in accordance with the first modulating signal and modulating and emitting the supplemental light beam in accordance with the second modulating signal.

Effect of the Invention

According to the present invention, color reproducibility can be improved while realizing higher luminance of a white image.

CARRYING OUT THE INVENTION

Exemplary embodiments of the present invention are next described with reference to the accompanying drawings. In the following explanation, components having the same functions are given the same reference numbers and redundant explanation may be omitted.

Figure 2:
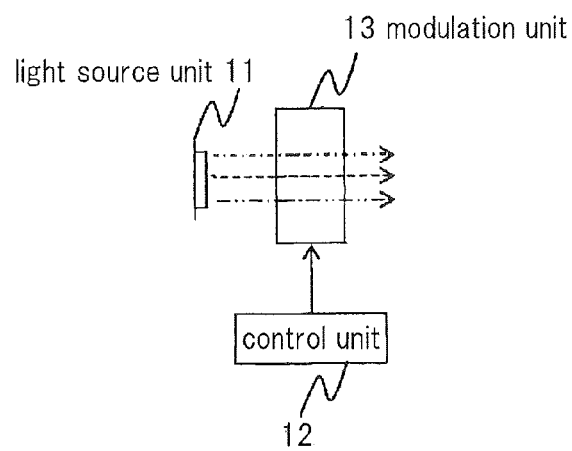
FIG. 2 shows the configuration of the projector of the first exemplary embodiment of the present invention.

FIG. 2 shows the configuration of the projector of the first exemplary embodiment of the present invention. As shown in FIG. 2, projector 10 of the present exemplary embodiment includes light source unit 11, control unit 12, and modulation unit 13. Light source unit 11 emits a plurality of basic light beams of different colors and a supplemental light beam of the same color as any of the colors of the plurality of basic light beams.

On the basis of the input picture signal that is received, control unit 12 supplies a PWM (Pulse Width Modulation) signal that is a modulating signal for modulating each basic light beam and supplemental light beam that is emitted from light source unit 11. In the following explanation, the first modulating signal that is the PWM signal for modulating the basic light is referred to as the first PWM signal, and the second modulating signal that is the PWM signal for modulating the supplemental light is referred to as the second PWM signal.

More specifically, on the basis of the input picture signal, control unit 12 supplies to modulation unit 13: the first PWM signal that accords with the color of each pixel of the image indicated by the input picture signal, and the second PWM signal that, in each pixel, accords with a specific color level that indicates the degree of similarity between the color of that pixel and, from among the colors of the basic light, a prescribed color, that differs from the color of the supplemental light.

Modulation unit 13 modulates and emits each basic light beam from light source unit 11 in accordance with the first PWM signal from control unit 12 and modulates and emits the supplemental light beam from light source unit 11 in accordance with the second PWM signal from control unit 12.

The optics that include light source unit 11 and modulation unit 13 will next be described in greater detail.

Figure 3:
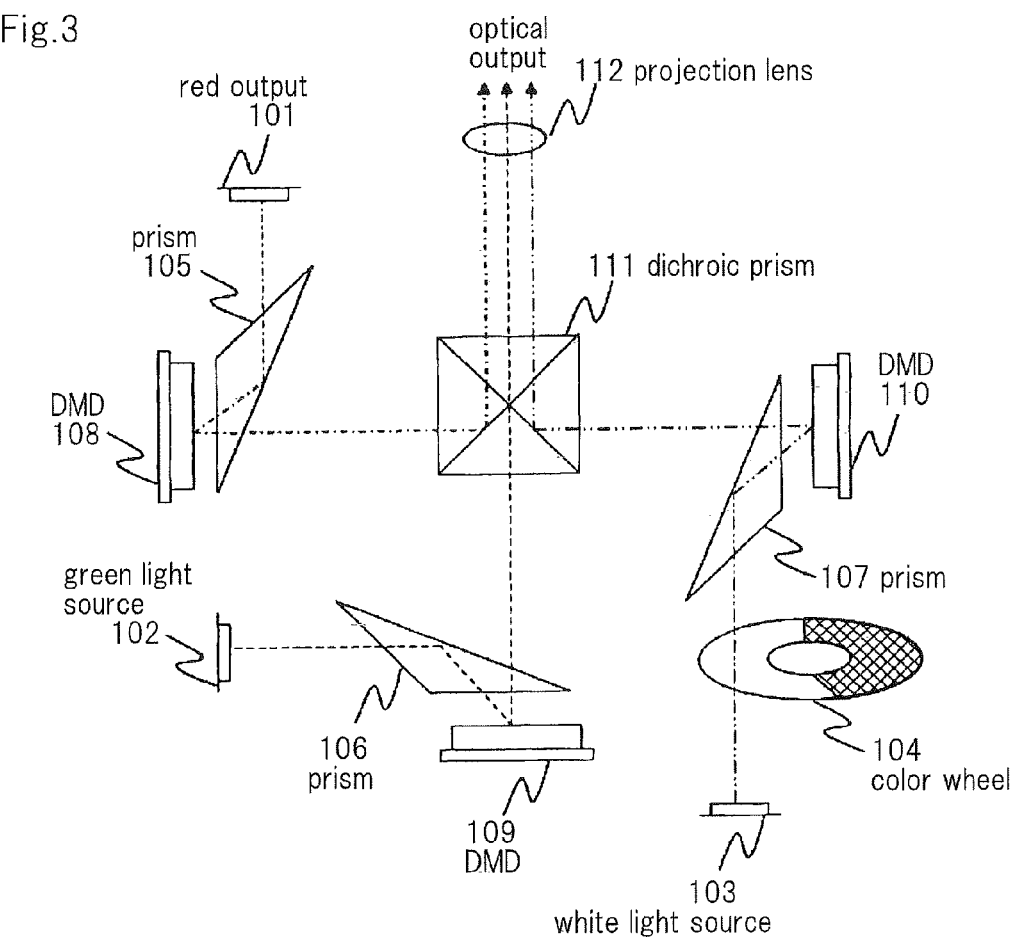
FIG. 3 shows the configuration of the optics of the projector of the first exemplary embodiment of the present invention.

FIG. 3 shows the configuration of the optics of projector 10. The optics shown in FIG. 3 include: red light source 101, green light source 102, white light source 103, color wheel 104, prisms 105-107, DMDs (Digital Mirror Devices) 108-110, dichroic prism 111, and projection lens 112.

Red light source 101, green light source 102, white light source 103, and color wheel 104 make up light source unit 11 shown in FIG. 2. In the example of FIG. 3, light source unit 11 emits red light, green light and blue light as the basic light and emits green light as the supplemental light.

More specifically, red light source 101 emits a red light beam, which is one of the basic light beams. Green light source 102 emits a green light beam, which is one of the basic light beams. White light source 103 emits a white light beam.

Color wheel 104 is arranged on the optical path of the white light that is emitted from white light source 103, time-divides the irradiated white light between the blue light that is basic light and green light that is supplemental light, and emits the result. In the present exemplary embodiment, color wheel 104 is assumed to have a board that can be rotated with a prescribed rotational axis as center, and a blue filter that transmits blue light and a green filter that transmits green light being provided on this board.

Prism 105 is provided on the optical path of the red light that is emitted from red light source 101, and reflects this red light and irradiates the red light into DMD 108. Prism 106 is provided on the optical path of the green light that is emitted from green light source 102, reflects this green light, and irradiates the green light into DMD 109. Prism 107 is provided on the optical path of the blue light and green light that are emitted from color wheel 104, reflects the blue light and green light, and irradiates the blue light and green light into DMD 110.

DMDs 108-110 make up modulation unit 13 shown in FIG. 2. A DMD typically has a configuration in which a plurality of micromirrors that are provided and correspond to each of a plurality of pixels is arrayed in matrix form and modulates irradiated light by switching the state of each micromirror.

DMDs 108-110 of the present exemplary embodiment have, as the state of each micromirror, an ON state in which irradiated light is emitted in a first direction toward dichroic prism 111 and an OFF state in which irradiated light is emitted in a second direction that differs from the first direction. In addition, DMDs 108-110 each modulate incident light by switching each micromirror (by each pixel) between the ON state and OFF state in accordance with the PWM signal that is received as input.

Specifically, DMD 108 modulates red light from prism 105 in accordance with the first PWM signal, DMD 109 modulates green light from prism 106 in accordance with the first PWM signal, and DMD 110 modulates blue light from prism 107 in accordance with the first PWM signal and green light from prism 107 in accordance with the second PWM signal.

Dichroic prism 111 emits each basic light beam and the supplemental light beam from DMDs 108-110 in the same direction by way of projection lens 112 (the direction of the optical output of FIG. 3). Dichroic prism 111 and projection lens 112 is one example of the configuration of the projection optics unit and project each of the basic light beams and the supplemental light beam from DMDs 108-110 onto a projection surface such as a screen (not shown).

In other words, DMDs 108-110 project (i.e., emit to the outside) the light that is irradiated into micromirrors by way of the projection optics unit during the ON state, and during the OFF state, emit the light that is irradiated to the micromirrors in a direction in which projection is not carried out.

Control unit 12 shown in FIG. 2 is next described in greater detail.

Figure 4:
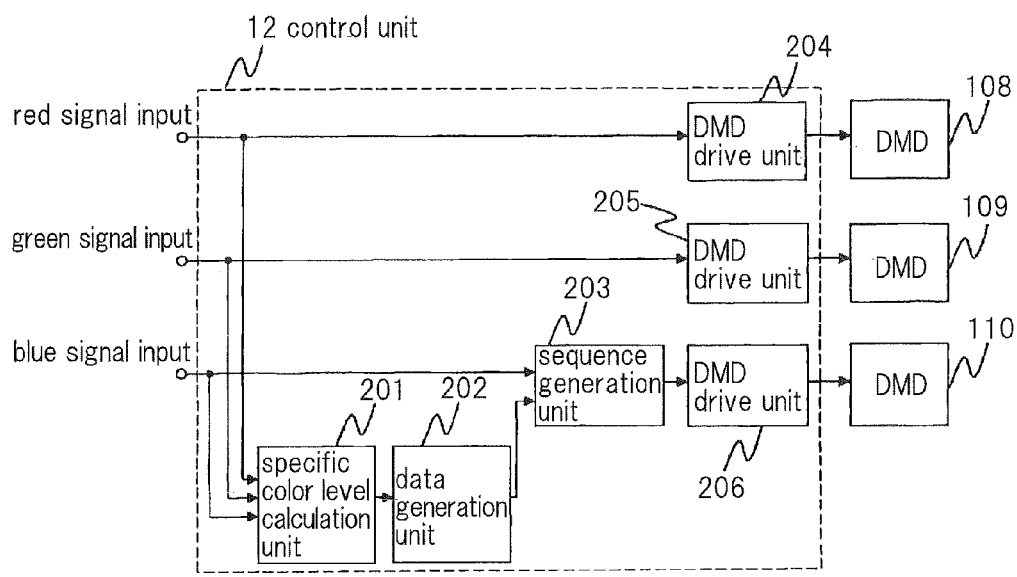
FIG. 4 shows the configuration of the control unit of the projector of the first exemplary embodiment of the present invention.

FIG. 4 shows the configuration of control unit 12 of the present exemplary embodiment. Control unit 12 shown in FIG. 4 includes: specific color level calculation unit 201, data generation unit 202, sequence generation unit 203, and DMD drive units 204-206. In addition, a red signal, green signal and blue signal that indicate for each pixel the luminance value of each of red, green, and blue are received as a picture signal in control unit 12.

On the basis of the red signal, green signal and blue signal that are the input picture signal, specific color level calculation unit 201 calculates, for each pixel of an image that is indicated in the input picture signal, the specific color level that indicates the degree of similarity between the color of that pixel and a prescribed color and supplies a specific color level signal that indicates the specific color level of each pixel and the input picture signal to data generation unit 202. The prescribed color is here assumed to be blue, and specific color level calculation unit 201 is assumed to supply, to data generation unit 202, a blue signal that corresponds to blue that is the prescribed color among the input picture signals.

On the basis of the specific color level signal from specific color level calculation unit 201 and the blue signal that is the prescribed color from specific color level calculation unit 201, data generation unit 202 determines the mixing amount that is the luminance value of the supplemental light in each pixel. For example, data generation unit 202 determines the mixing ratio that is the ratio of the luminance value of supplemental light to the luminance value of blue that is the prescribed color according to the specific color level and determines the mixing amount based on this mixing ratio and the luminance value of blue that is the prescribed color.

When the mixing amount of each pixel is determined, data generation unit 202 supplies to sequence generation unit 203 a mixing amount signal that indicates the mixing amount of each pixel.

On the basis of the mixing amount signal from data generation unit 202, the blue signal that is received as input, and a synchronizing signal of the input picture signal, sequence generation unit 203 generates and supplies sequence signals that indicate the luminance value of blue that is indicated in the blue signal in blue intervals in which color wheel 104 emits blue light and supplies sequence signals that indicate the mixing amount indicated in the mixing amount signal in supplemental light intervals in which color wheel 104 emits green light.

Figure 5:
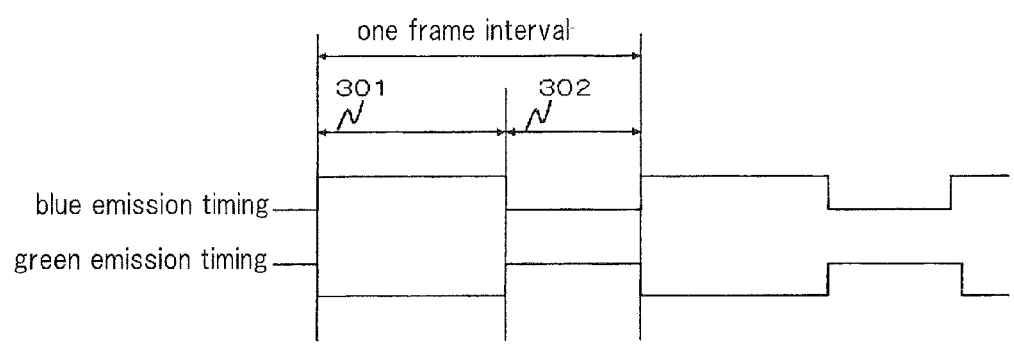
FIG. 5 shows an example of the emission interval of light.

In the present exemplary embodiment, color wheel 104 is assumed to be controlled such that white light is time-divided between blue light and green light within one frame interval of the input picture signals. FIG. 5 shows an example of the blue interval and the supplemental light interval in a case in which color wheel 104 time-divides white light between blue light and green light within a one-frame interval. In the example of FIG. 5, the one-frame interval is divided into blue interval 301 and supplemental light interval 302.

The synchronizing signal may be contained in the input picture signal, or may be applied as input separate from the input picture signal. In the present exemplary embodiment, the synchronizing signal is assumed to be contained in the input picture signal (specifically, in each of the red signal, green signal, and blue signal).

DMD drive unit 204 finds the red ON ratio that is the ON ratio of each micromirror of DMD 108 according to the luminance value that is indicated in the red signal for each one-frame interval of the input picture signal and supplies a first PWM signal that indicates the red ON ratio of each micromirror to DMD 108. The ON ratio is the ratio of the ON time interval in which a micromirror is set to the ON state in the lighting interval of each light source within one frame interval with respect to the OFF time interval in which a micromirror is set to the OFF state. In addition, the ON ratio may be defined by the ratio of the ON time interval in which a micromirror is set to the ON state in the lighting interval of each light source in one frame interval with respect to the lighting interval of each light source.

DMD drive unit 205 finds the green ON ratio that is the ON ratio of each micromirror of DMD 109 according to the luminance value that is indicated in the green signal for each one-frame interval of the input picture signal and supplies a first PWM signal that indicates the green ON ratio of each micromirror to DMD 109.

DMD drive unit 206 finds for each one-frame interval the blue ON ratio that is the ON ratio of each micromirror of DMD 110 in the blue interval within that one-frame interval according to the luminance value of blue that is indicated by the sequence signal. DMD drive unit 206 further finds the supplemental light ON ratio that is the ON ratio of each micromirror of DMD 110 in the supplemental light interval within that one-frame interval according to the mixing amount indicated by the sequence signal for each one-frame interval. DMD drive unit 206 then, for each blue interval, supplies to DMD 110 the first PWM signal that indicates the blue ON ratio and supplies to DMD 110 the second PWM signal that indicates the supplemental light ON ratio for each supplemental light interval.

In DMDs 108-110, the higher the ON ratio, i.e., the longer the ON time in a one-frame interval, the brighter is the projected image and the greater is the quantity of light that is projected on the projection surface by way of dichroic prism 111 and projection lens 112. As a result, the greater the luminance value or the mixing amount of each color, the greater is the ON ratio (ON time) set by DMD drive units 204-206, whereby the greater is the quantity of light projected on the projection surface by way of projection lens 112. For example, DMD drive units 204-206 increase the ON ratio (ON time) by making the ON ratio proportional to the luminance value or mixing amount of each color.

The operation of the projector of the present exemplary embodiment is next described.

Figure 6:
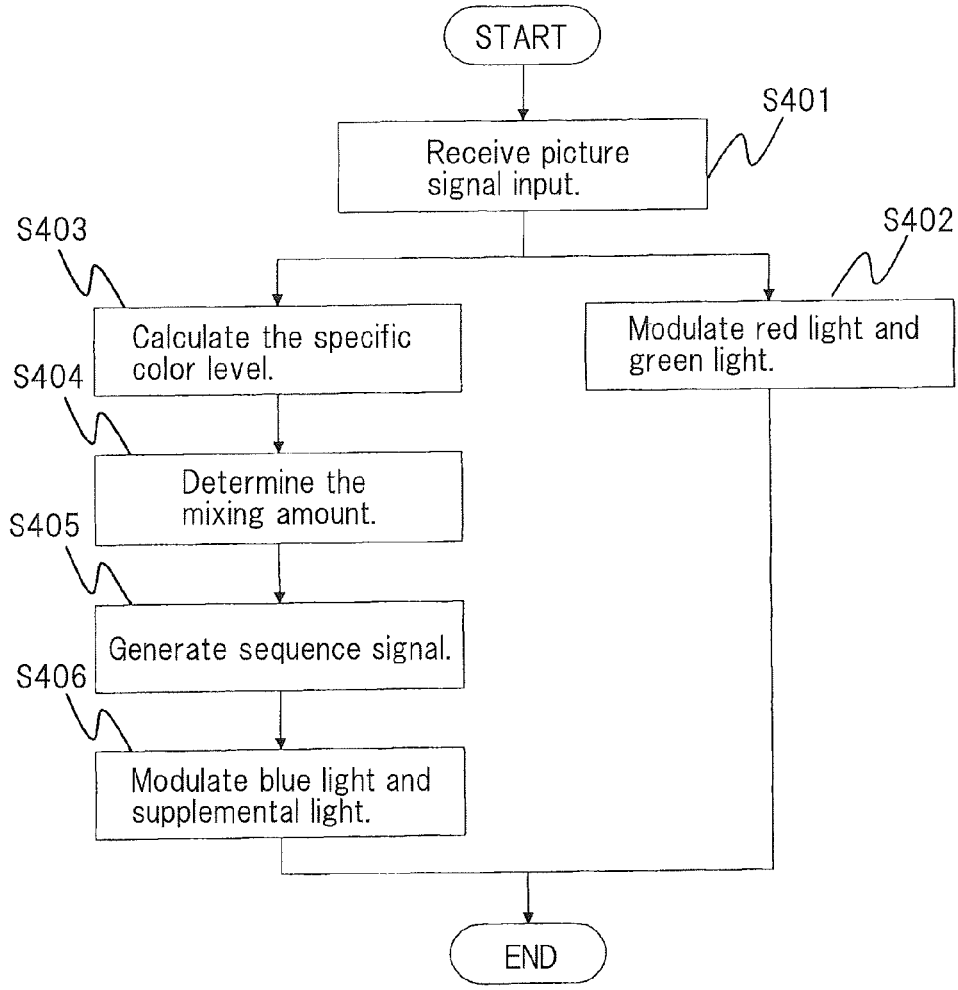
FIG. 6 is a flow chart for describing an example of the operation of the control unit of the projector of the first exemplary embodiment of the present invention.

FIG. 6 is a flow chart for describing the operation of control unit 12. The processing described hereinbelow is executed for each frame of the input picture signal.

First, the red signal of the input picture signal that is applied as input from an outside device is received in specific color level calculation unit 201 and DMD drive unit 204, the green signal is received in specific color level calculation unit 201 and DMD drive unit 205, and the blue signal is received in specific color level calculation unit 201 and DMD drive unit 206 (Step S401).

DMD drive unit 204 finds the red ON ratio on the basis of the red luminance value that is indicated in the red signal that was received, generates the first PWM signal that indicates the red ON ratio, and applies this first PWM signal to DMD 108. DMD drive unit 205 finds the green ON ratio on the basis of the green luminance value that is indicated in the green signal that was received, generates a first PWM signal that indicates the green ON ratio, and supplies this first PWM signal to DMD 109. In this way, DMDs 108 and 109 modulate the red light beam and green light beam that are basic light beams on the basis of the first PWM signal (Step S402).

Specific color level calculation unit 201 calculates the specific color level for each pixel on the basis of the red signal, green signal, and blue signal that were received as input and generates a specific color level signal that indicates the specific color level of each pixel. Specific color level calculation unit 201 then supplies the specific color level signal and blue signal to data generation unit 202 (Step S403).

Data generation unit 202 receives the blue signal and the specific color level signal, determines the mixing amount of each pixel based on the specific color level signal and blue signal, and generates a mixing amount signal that indicates this mixing amount for each pixel. Data generation unit 202 then supplies a mixing amount signal to sequence generation unit 203 (Step S404).

Sequence generation unit 203 receives the mixing amount signal and blue signal, and based on this mixing amount signal and blue signal, generates and supplies to DMD drive unit 206 a sequence signal that indicates the luminance value of blue that is indicated in the blue signal in the blue interval of color wheel 104 and that indicates the mixing amount that is indicated in the mixing amount signal in the supplemental light interval of color wheel 104 (Step S405)

DMD drive unit 206 receives the sequence signal and finds the blue ON ratio and supplemental light ON ratio on the basis of this sequence signal, generates a first PWM signal that indicates the blue ON ratio and a second PWM signal that indicates the supplemental light ON ratio and supplies these signals to DMD 110. DMD 110 thereby modulates the blue light beam in accordance with the first PWM signal and modulates the green light beam that is the supplemental light beam in accordance with the second PWM signal (Step S406).

The process of calculating the specific color level in Step S403 and the process of determining the mixing amount in Step S404 are explained in greater detail hereinbelow.

Typically speaking, the specific color level is the degree of similarity between an object color and a reference color, this being a value equal to 1.0 when the object color matches the reference color and becomes a smaller value as the object color diverges from the reference color. In addition, the specific color level is represented by a function that takes as variables the hue H, the saturation S, and the brightness V of the object color.

In the present exemplary embodiment, the input picture signal (red signal, green signal, and blue signal) is in the RGB format, and specific color level calculation unit 201 therefore first calculates for each pixel from the input picture signal the hue H, saturation S and brightness V of the object color, which is the color of that pixel.

Specifically, specific color level calculation unit 201 calculates the hue H, the saturation S, and the brightness V of each pixel on the basis of the values (luminance values) of the red signal, the green signal and the blue signal, as shown below. At this time, when the input picture signal indicates the luminance value of each color by integer values of 0-255, specific color level calculation unit 201 converts the signal to a signal that indicates the luminance values of each color by real numbers of 0-1.0 before converting the input picture signals to the HSV format. The values of the red signal, green signal, and blue signal indicated by real number values are each represented by R, G, and B.

Specific color level calculation unit 201 calculates values for hue H by using Formula 1.

[Formula 1]

$$H = B' + \left(\frac{A}{\text{Max}(R, G, B) - \text{Min}(R, G, B)}\right) \times 60 \quad \text{(Formula 1)}$$

Here, Max(X, Y, Z) is a function that indicates the maximum value among X, Y, and Z, and Min(X, Y, Z) is a function that indicates the minimum value of X, Y, and Z. In addition, coefficients A and B' are values determined based on luminance values R, G, and B. More specifically, the correspondence relation between coefficient A and B' and luminance values R, G, and B is represented by Table 1.

TABLE 1

| Condition | Identification (T) | B' | A |
|---|---|---|---|
| R = G = B | colorless | — | — |
| R ≥ B ≥ G | 0 | 0 | R-B |
| R ≥ G ≥ B | 1 | 60 | G-B |
| G ≥ R ≥ B | 2 | 120 | G-R |
| G ≥ B ≥ R | 3 | 180 | B-R |
| B ≥ G ≥ R | 4 | 240 | B-G |
| B ≥ R ≥ G | 5 | 300 | R-G |

In addition, specific color level calculation unit 201 uses Formula 2 to calculate saturation S.

[Formula 2]

$$S = \frac{\text{Max}(R, G, B) - \text{Min}(R, G, B)}{\text{Max}(R, G, B)} \quad \text{(Formula 2)}$$

Still further, specific color level calculation unit 201 uses Formula 3 to calculate brightness V.
[Formula 3]

$$V = \text{Max}(R, G, B) \quad \text{(Formula 3)}$$

Upon calculating the hue H, saturation S, and brightness V of each pixel as shown above, specific color level calculation unit 201 calculates the specific color level of each pixel on the basis of the hue H, saturation S, and brightness V.

Typically, specific color level Δ1 is calculated from hue H, saturation S and brightness V using Formula 4 that is a basic calculation formula.

[Formula 4]

$$\Delta 1 = \frac{pos(m1/2 - |H - Hc1|)}{m1/2} \times S \times V \quad \text{(Formula 4)}$$

Here, the function pos(x) is a function that becomes "x" when x is positive and "0" when x is not positive. Hc1 is the central hue that is the hue of the reference color, and m1 is the detection hue range that is a value that indicates the range of hues in the object color for calculating specific color level. The detected hue range is a value that is set in advance and contains the hue of the reference color.

Figure 7:
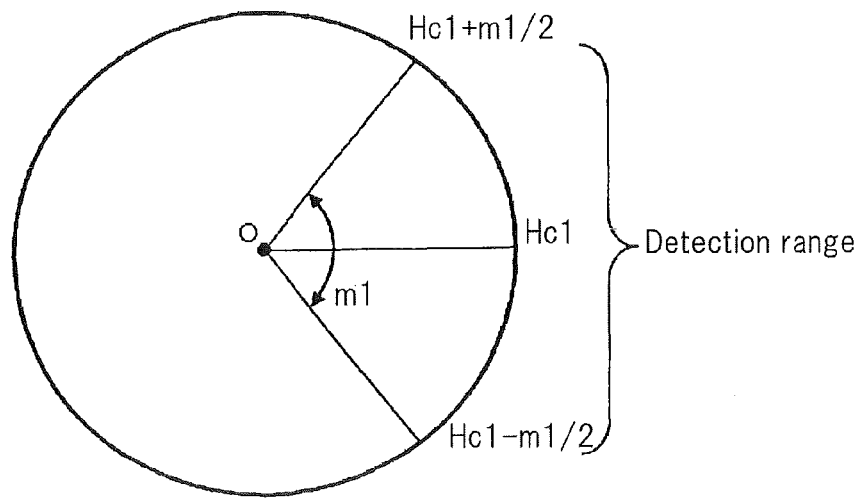
FIG. 7 shows the relation between a central hue and the detection hue range.

FIG. 7 shows the relation between the central hue Hc1 and the detection hue range m1. In FIG. 7, the axis from center point O toward the outer circumference of the circle represents the saturation S, the angle of leftward rotation around the center point O represents the hue H, and the axis that is perpendicular to the page surface that passes through the center point O represents the brightness V. In addition, the detection hue range m1 is represented by the center angle of the circle, as shown in FIG. 7.

As shown in Formula 4 and FIG. 7, specific color level Δ1 is 1.0 when the hue H of the object color is center hue Hc1, and moreover, the saturation S and the brightness V of the object color are maximums. In addition, the specific color level Δ1 becomes smaller as the hue H of the object color becomes more distant from central hue Hc1 or as the saturation S and brightness H of the object color decrease. When the hue of the object color is outside the detected hue range m1, the specific color level Δ1 becomes "0".

Figure 8:
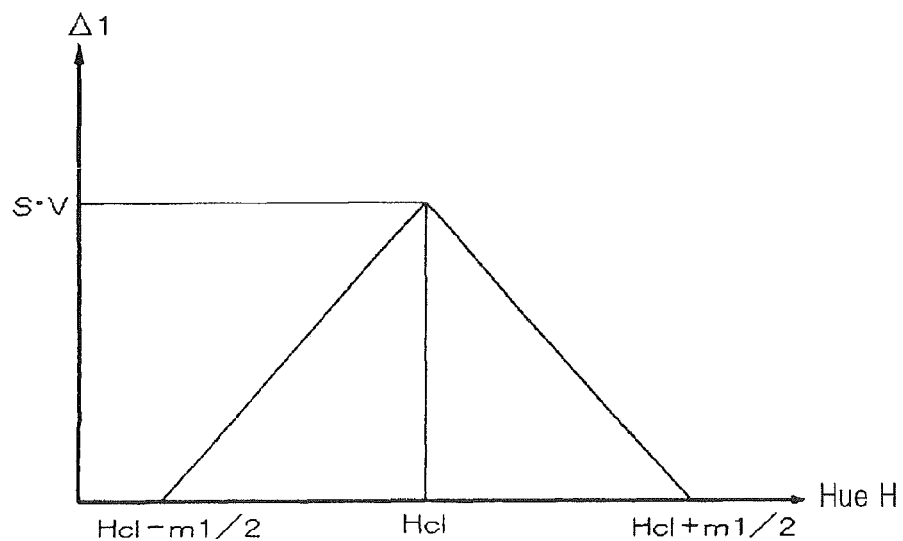
FIG. 8 shows the relation between the hue of an object color and the specific color level.

FIG. 8 shows the relation between the hue H of the object color and the specific color level Δ1 when the saturation S and brightness V of the object color are fixed. As shown in FIG. 8, when the hue H of the object color is the center hue Hc1, the specific color level Δ1 of the object color is the value of saturation S×brightness V, this value decreasing linearly as the hue H of the object color becomes distant from the center hue Hc1.

The specific color level that is calculated in the present exemplary embodiment is the specific color level with respect to blue of the color of each pixel. In other words, the reference color is blue, and the object color is the color of each pixel. In the following explanation, the specific color level of an object color with respect to blue is referred to as the blue specific color level.

Figure 9:
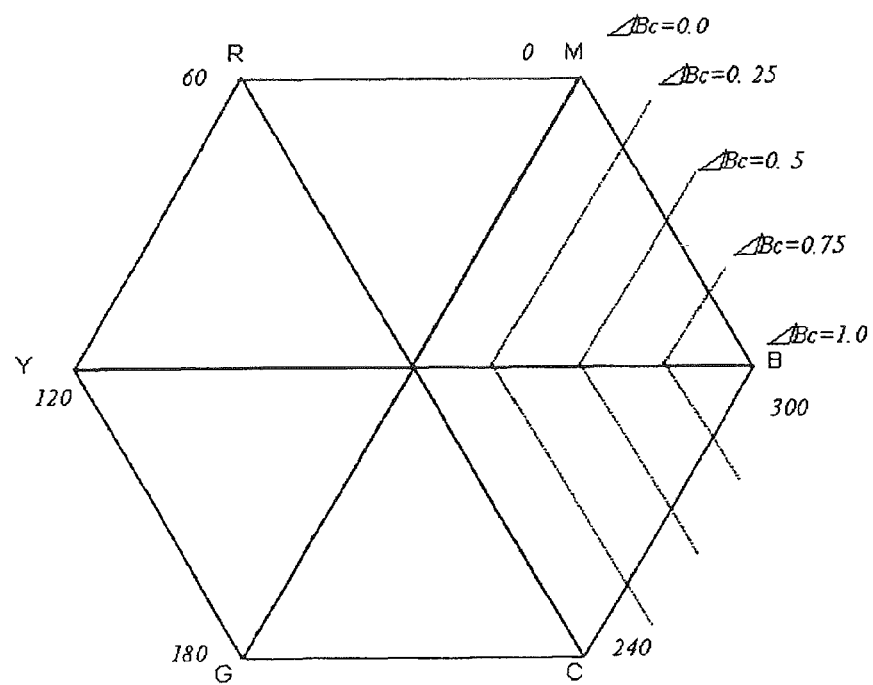
FIG. 9 shows the specific color level of the object color with respect to blue.

FIG. 9 shows the blue specific color level. As shown in FIG. 9, the blue specific color level ΔB becomes 1.0 when the object color is blue and decreases as the object color diverges from blue.

In addition, the blue specific color level ΔBc corresponds to a case in which center hue Hc1 is made the hue of blue (Hc1=300) in Formula 4, and more specifically, is represented by Formula 5:

[Formula 5]

$$\Delta Bc = \frac{pos(m1/2 - |H - 300|)}{m1/2} \times S \times V \quad \text{(Formula 5)}$$

Accordingly, specific color level calculation unit 201 uses Formula 5 to calculate the blue specific color level of each pixel from the hue H, saturation S, and brightness V of each pixel that was calculated.

Data generation unit 202 next determines the mixing amount MG of each pixel on the basis of the blue specific color level ΔBc of each pixel and value B of each pixel of the blue signal. More specifically, the greater the blue specific color level ΔBc of a pixel, the greater is the amount by which data generation unit 202 decreases the mixing amount.

For example, data generation unit 202 applies Formula 6 for each pixel to determine mixing amount MG.
[Formula 6]

$$MG = (1 - \Delta Bc) \times B \quad \text{(Formula 6)}$$

In this example, DMD drive unit 206 supplies a second PWM signal in which the supplemental light ON ratio is equal to the blue ON ratio when the mixing amount MG is B, supplies a second PWM signal in which the supplemental light ON ratio is 50% of the blue ON ratio when the mixing amount MG is 0.5×B, and supplies a second PWM signal in which the ON ratio is 0% when the mixing amount is 0. The part (1−ΔBc) in Formula 6 is a mixing rate that is the ratio of the luminance value of supplemental light to the luminance value of blue.

Figure 10:
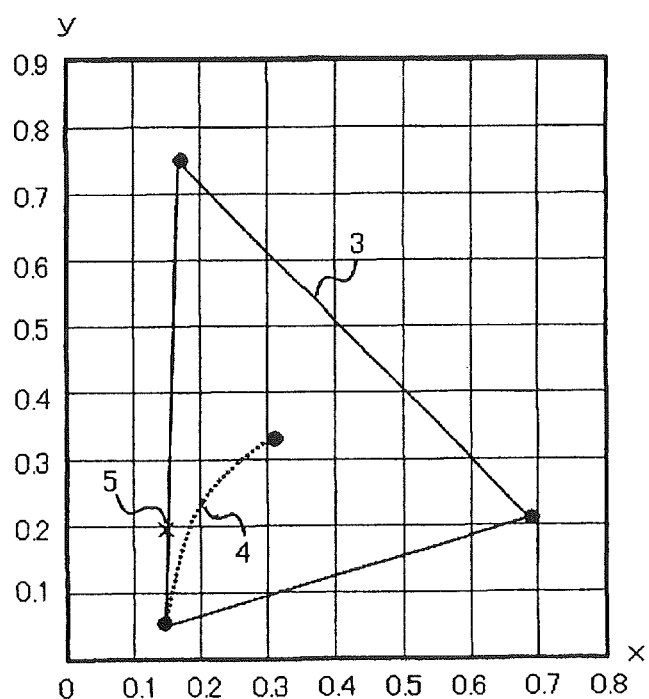
FIG. 10 is a chromaticity diagram showing the color gamut of a projected image realized by the projector of the first exemplary embodiment of the present invention.

FIG. 10 is an xy chromaticity diagram that shows an example of the color gamut of the projected image of a projector of the present exemplary embodiment. FIG. 10 shows color gamut 3, characteristic curve 4, and reference coordinates 5.

Color gamut 3 is the color gamut of a projected image. Characteristic curve 4 is a curve that shows the color of a projected image when the color of pixels is changed from white to blue by varying the saturation of the color of pixels of the image that is indicated by the input picture signal. Finally, reference coordinates 5 are the coordinates of the color of a projected image when the color of pixels of an image that is indicated by the input picture signal is blue in a case in which blue light and green light are emitted from the blue light source as in the projection-type display device disclosed in Patent Document 1.

Figure 1A:
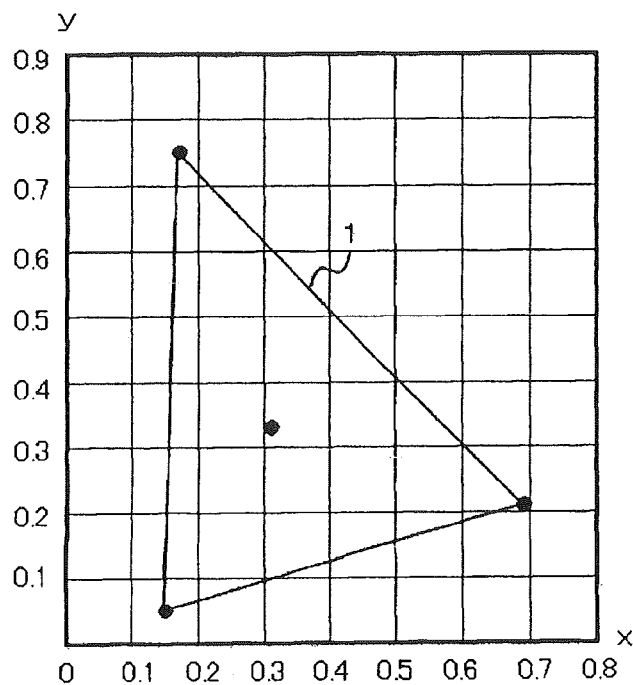
FIG. 1A is a chromaticity diagram showing the color gamut of a projected image realized by a projector of a first example of the related art.
Figure 1B:
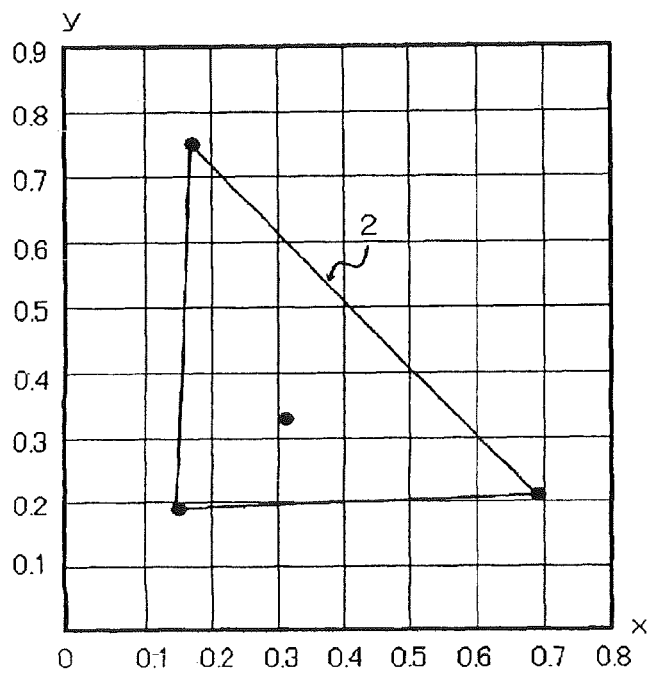
FIG. 1B is a chromaticity diagram showing the color gamut of a projected image realized by a projector of a second example of the related art.

As shown in FIG. 10, color gamut 3 of the projected image contains the region that displays blue, the same as color gamut 1 of a projected image in a case in which only blue light is emitted from the blue light source shown in FIG. 1A. Accordingly, the color reproducibility of blue is high. In addition, in the vicinity of white, higher luminance can be realized because the mixing amount is high.

Although DMDs 108-110 were used as modulating elements that modulate incident light in modulation unit 13 of the projector of the present exemplary embodiment described hereinabove, modulating elements other than DMDs may also be used. For example, any element such as an LCD (Liquid Crystal Display) or LCOS (Liquid Crystal On Silicon) that modulates incident light by adjusting the quantity of light of incident light that is transmitted or reflected may also be used as a modulation element in modulation unit 13.

Although light source unit 11 was made up of red light source 101, green light source 102, white light source 103, and color wheel 104, light source unit 11 may also be constituted by a blue light source and a green light source separate from green light source 102 in place of white light source 103 and color wheel 104.

In addition, control unit 12 may also modulate basic light and supplemental light by adjusting the time of light emission or the amount of light emission that light source unit 11 emits light in addition to the modulation by modulation unit 13 of the basic light and supplemental light. For example, when, from among the luminance values of each pixel of an image that are indicated by the input picture signal, the maximum luminance value is equal to or greater than a threshold value that has been set in advance, control unit 12 sets the light emission time interval and the light emission amount as prescribed values, and when the maximum luminance value falls below a threshold value, control unit 12 modulates the basic light and supplemental light by decreasing at least one of the light emission time interval and the light emission amount in proportion to the decrease of the maximum luminance value.

In addition, although the specific color level, mixing amount, and mixing ratio were determined using a calculation formula, the method of determining the specific color level, mixing amount, and mixing ratio is not limited to this example. For example, specific color level calculation unit 201 may also hold a look-up table showing the colors of pixels and the correspondence relation between the colors of these pixels and a prescribed color (blue) and then use this look-up table to determine the specific color level of each pixel. Alternatively, data generation unit 202 may hold a look-up table that shows the correspondence relation between specific color levels and mixing amounts or mixing ratios and then use this look-up table to determine the mixing amount or mixing ratio. At this time, specific color level calculation unit 201 may also use a look-up table to-determine the mixing ratio and then use Formula (6) to calculate the mixing amount.

Although projection lens 112 was used as the configuration of the projection optics, components such as a projection mirror may also be used in place of projection lens 112 or in addition to projection lens 112.

According to the present exemplary embodiment as described hereinabove, green light, which is the supplemental light, is modulated in accordance with the specific color level that indicates the degree of similarity between the color of a pixel and blue, and as a result, an image can be brightened by increasing the quantity of light of green light when the color of a pixel is in the vicinity of white, and the color reproducibility can be improved by decreasing the quantity of light of green light when the color of a pixel is in the vicinity of blue. Accordingly, color reproducibility can be improved while realizing higher luminance of white images.

In the present exemplary embodiment, moreover, the higher the specific color level that corresponds to each pixel, the lower is the quantity of supplemental light of that pixel that is projected from the projection optics, and as a result, higher luminance of a white image and improved color reproducibility can be more reliably realized.

The second exemplary embodiment of the present invention is next described.

Figure 11:
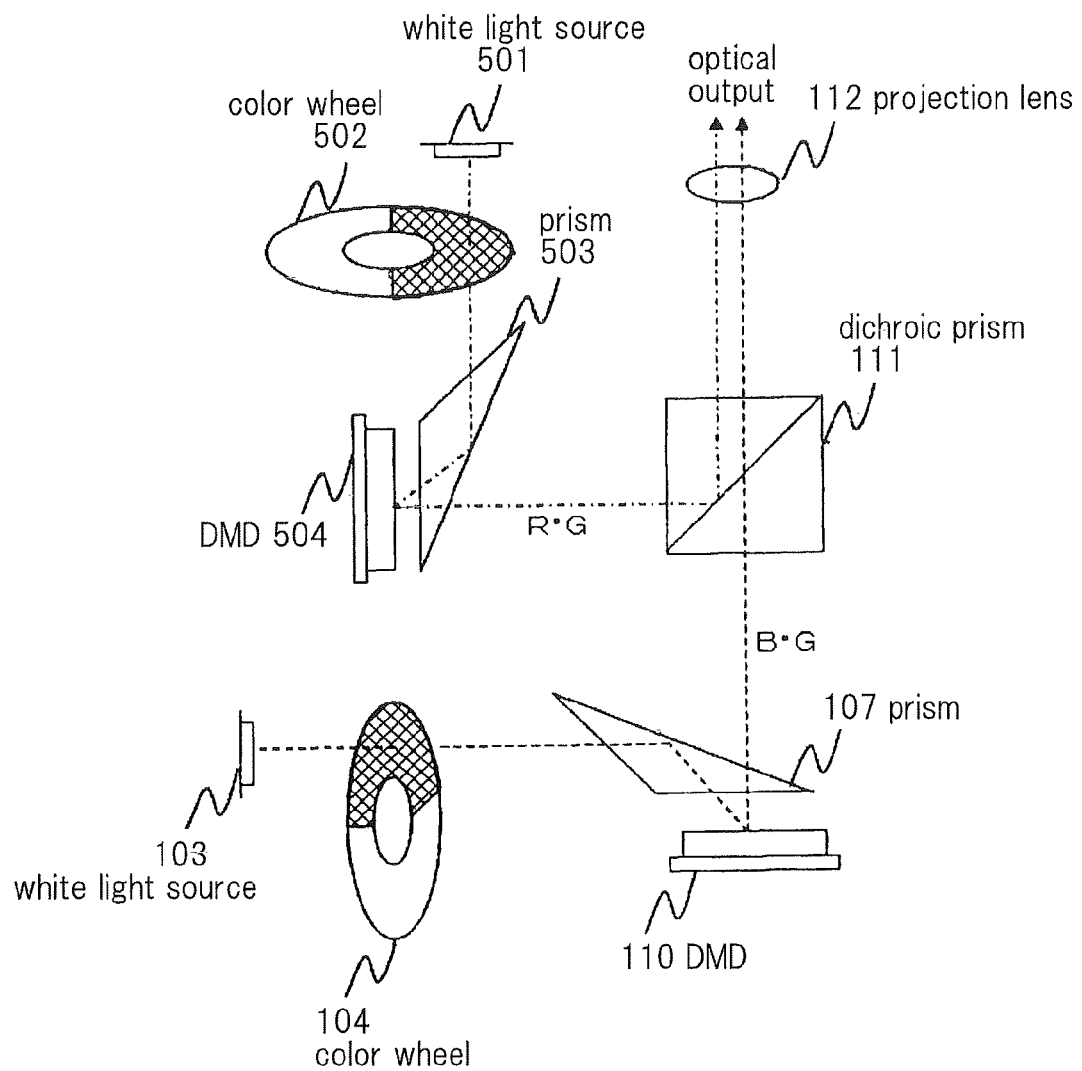
FIG. 11 shows the configuration of the optics of the projector of the second exemplary embodiment of the present invention.

FIG. 11 shows the configuration of the optics of the projector of the present exemplary embodiment. Compared with the optics of the first exemplary embodiment shown in FIG. 3, the optics shown in FIG. 11 differs with respect to the configuration for emitting and modulating red light and green light that are basic light, but the configuration for emitting and modulating the blue light that is basic light and the green light that is the supplemental light are the same.

More specifically, the optics shown in FIG. 11 includes: white light sources 103 and 501, color wheels 104 and 502, prisms 107 and 503, DMDs 110 and 504, and dichroic prism 111.

In the present exemplary embodiment, white light sources 103 and 501 and color wheels 104 and 502 make up light source unit 11 shown in FIG. 2. In addition, DMDs 110 and 504 make up modulation unit 13 shown in FIG. 2.

White light source 501 emits white light. Color wheel 502 is arranged on the optical path of the white light that is emitted from white light source 501, time-divides the irradiated white light between the red light and green light that are basic light, and emits the result.

In the present exemplary embodiment, color wheel 502 has a disk-shaped board that is rotatable with a prescribed axis of rotation as center, this disk-shaped board being provided with a red filter that transmits red light and a green filter that transmits green light. In addition, color wheel 502 is assumed to be controlled to time-divide the white light into red light and green light in a one-frame interval of the input picture signals.

Prism 503 is provided on the optical path of the red light and green light that are time-divided at color wheel 502 and reflects and irradiates the red light and green light into DMD 504.

DMD 504 modulates and emits the red light and green light that are irradiated from prism 503 by switching each of its micromirrors between the ON state and OFF state in accordance with the PWM signal that is received as input.

Dichroic prism 111 emits each of the light beams of each color from DMDs 110 and 504 in the same direction (the direction of optical output of FIG. 11) by way of projection lens 112.

The control unit of the present exemplary embodiment is next described.

Figure 12:
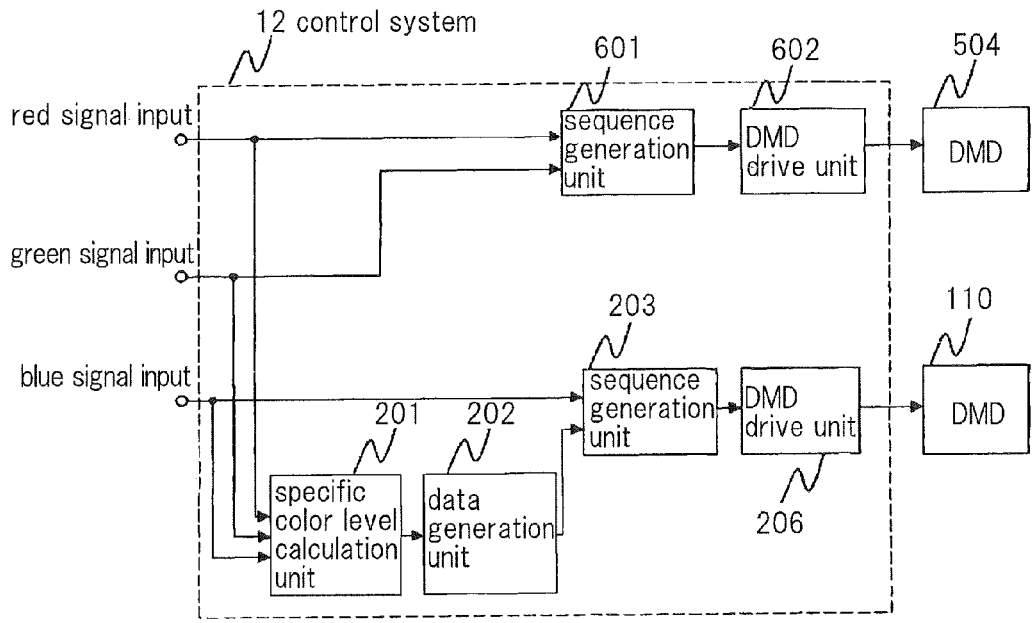
FIG. 12 shows the configuration of the control unit of the projector of the second exemplary embodiment of the present invention.

FIG. 12 is a block diagram showing the configuration of the control unit of the present exemplary embodiment. Compared with control unit 12 of the first exemplary embodiment shown in FIG. 4, control unit 12 of the present exemplary embodiment shown in FIG. 12 has a different configuration for modulating the red light and green light that are basic light, but the configuration for modulating the blue light that is basic light and green light that is supplemental light is the same.

More specifically, control unit 12 shown in FIG. 12 includes: specific color level calculation unit 201, data generation unit 202, sequence generation units 203 and 601, and DMD drive units 204 and 602.

On the basis of the red signal and green signal that are input picture signals and the synchronizing signal of these signals, sequence generation unit 601 generates and supplies a sequence signal that indicates the luminance value shown by the red signal during red intervals in which color wheel 502 emits red light and that indicates the luminance value shown by the green signal during green intervals in which color wheel 502 emits green light.

For each one-frame interval of the input picture signals, DMD drive unit 602 finds the red ON ratio that is the ON ratio of each micromirror of DMD 504 in red intervals in the one-frame interval in which color wheel 502 emits red light in accordance with the red luminance value indicated by the sequence signal that was supplied from sequence generation unit 601. In addition, for each one-frame interval, DMD drive unit 602 finds the green ON ratio that is the ON ratio of each micromirror of DMD 504 in green intervals in which color wheel 502 emits green light in the one-frame interval according to the green luminance value shown by the sequence signal that was supplied from sequence generation unit 601. DMD drive unit 206 supplies to DMD 110 the first PWM signal that indicates the red ON ratio for each red interval and supplies to DMD 110 the first PWM signal that indicates the green ON ratio for each green interval. In this way, DMD 110 modulates and supplies the red light and green light that was irradiated from color wheel 502 in accordance with the first PWM signal.

In the present exemplary embodiment as well, the configuration for modulating the blue light that is basic light and the green light that is supplemental light is the same as in the first exemplary embodiment, and as in the first exemplary embodiment, color reproducibility can be improved while realizing higher luminance of white images.

The third exemplary embodiment of the present invention is next described.

Figure 13:
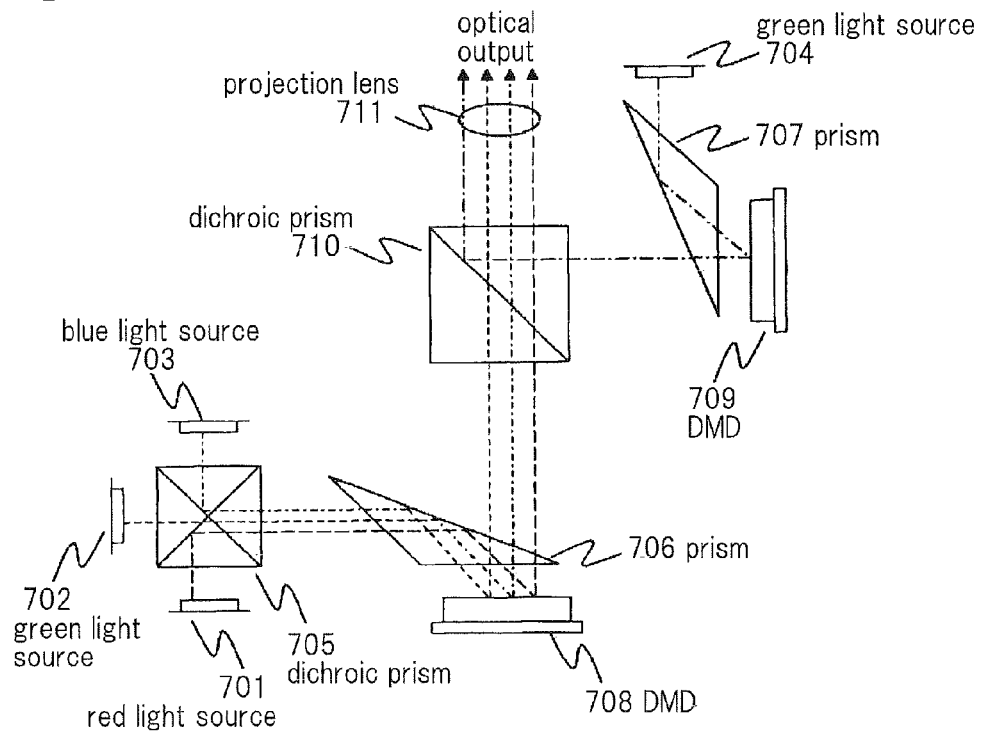
FIG. 13 shows the configuration of the optics of the projector of the third exemplary embodiment of the present invention.

FIG. B shows the configuration of the optics of the projector of the third exemplary embodiment of the present invention. The optics shown in FIG. 13 includes red light source 701, green light sources 702 and 704, blue light source 703, dichroic prisms 705 and 710, prisms 706 and 707, DMDs (Digital Mirror Devices) 708 and 709, and projection lens 711.

Red light source 701, green light sources 702 and 704, and blue light source 703 make up light source unit 11 shown in FIG. 2. In the present exemplary embodiment, the light source unit is assumed to emit red light, green light, and blue light as the basic light and emit green light as the supplemental light, as in the first exemplary embodiment.

More specifically, red light source 701, green light source 702, and blue light source 703 each emit red light, green light, and blue light as basic light. In addition, green light source 704 emits green light as supplemental light. In the present exemplary embodiment, red light source 701, green light sources 702 and 704, and blue light source 703 are each assumed to be constituted by light-emitting elements that can turn ON and OFF rapidly such as an LED or LD (Laser Diode).

Dichroic prism 705 emits in the same direction each basic light beam that is emitted from each of red light source 701, green light source 702, and blue light source 703.

Prism 706 reflects and irradiates into DMD 708 each basic light beam that is emitted from dichroic prism 705. Prism 707 reflects and irradiates into DMD 709 the green light beam that is emitted from green light source 704.

DMDs 708 and 709 make up modulation unit 13 shown in FIG. 2. More specifically, DMD 708 modulates and emits each basic light beam from prism 706 in accordance with the first PWM signal, and DMD 709 modulates and emits the green light that is the supplemental light from prism 707 in accordance with the second PWM signal.

Dichroic prism 710 emits each basic light beam from DMD 708 and the supplemental light beam from DMD 709 in the same direction (the direction of optical output of FIG. 13) by way of projection lens 711. Dichroic prism 710 and projection lens 711 are one example of the configuration of the projection optics and project each basic light beam and the supplemental light beam from DMDs 708 and 709 onto a projection surface.

The control unit of the present exemplary embodiment is next described. In the following description and in the figures, red light source 701, green light source 702, and blue light source 703 are sometimes together identified as basic light sources 701-703.

Figure 14:
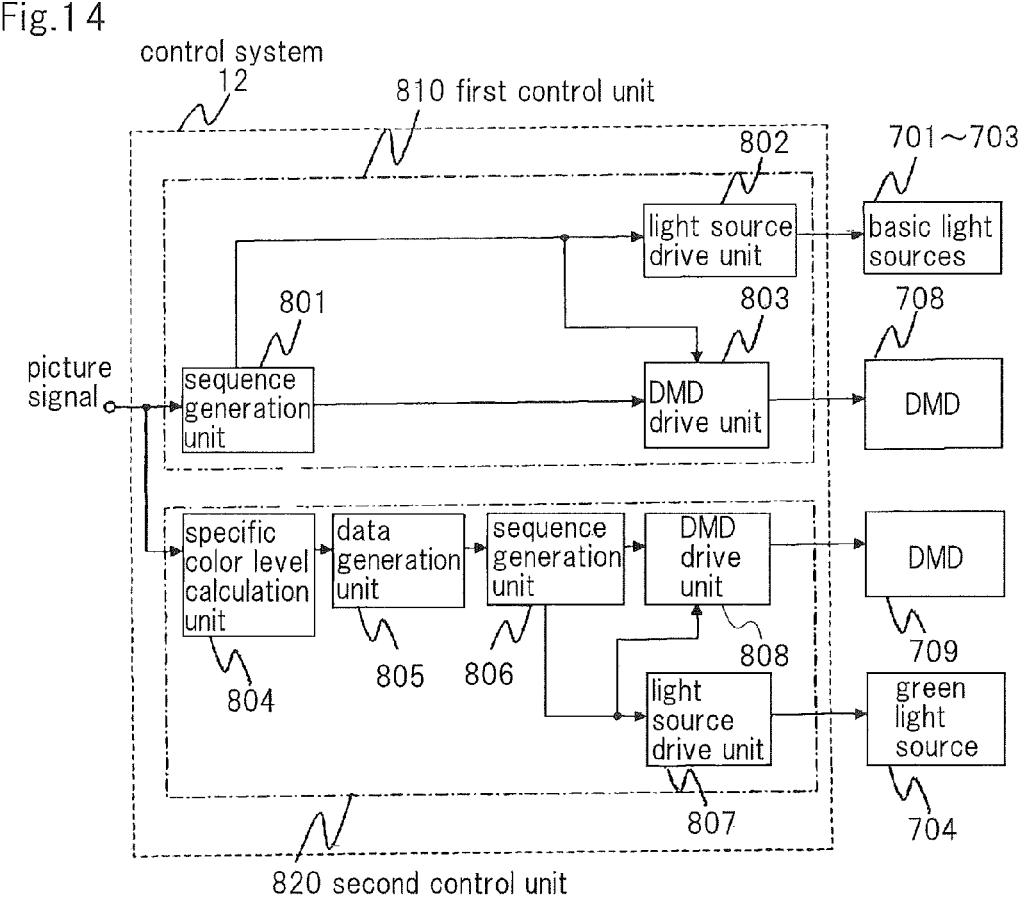
FIG. 14 shows the configuration of the control unit of the projector of the third exemplary embodiment of the present invention.

FIG. 14 is a block diagram showing the configuration of the control unit of the present exemplary embodiment. Control unit 12 shown in FIG. 14 includes first control unit 810 and second control unit 820. A digital picture signal of the RGB format that indicates the luminance values for each pixel for red, green and blue is applied as a picture signal to control unit 12.

First control unit 810 supplies the first PWM signal that accords with the color of each pixel of the received input picture signal to DMD 708. More specifically, first control unit 810 includes sequence generation unit 801, light source drive unit 802, and DMD drive unit 803.

Sequence generation unit 801 generates basic lighting timing signals that indicate the lighting interval for causing each of basic light sources 701-703 to light on the basis of the synchronizing signal of the input picture signal. In the present exemplary embodiment, it is assumed that basic light sources 701-703 are lighted in a field sequential mode in which a plurality of light sources are lighted in sequence within one frame of the input picture signal. As a result, sequence generation unit 801 generates basic lighting timing signals such that basic light sources 701-703 light in sequence within one frame of the input picture signal.

Figure 15:
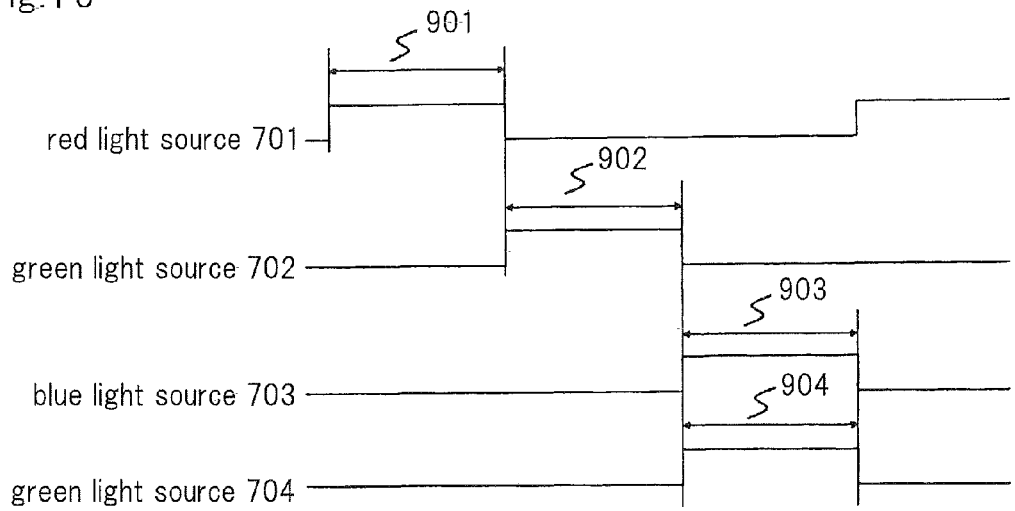
FIG. 15 is a timing chart showing the lighting intervals of the light sources of the third exemplary embodiment of the present invention.

In the following explanation, sequence generation unit 801 is assumed to generate basic lighting timing signals such that each of basic light sources 701-703 lights in lighting intervals 901-903 within one frame of the input picture signal, as shown in FIG. 15. It will be assumed that the lengths of each of lighting intervals 901-903 are equal and that lighting intervals 901-903 do not overlap.

Sequence generation unit 801 time-divides the input picture signal into a plurality of luminance signals that indicate the luminance values of each of red, green, and blue for each pixel in accordance with the basic lighting timing signals. Sequence generation unit 401 then supplies the basic lighting timing signals to light source drive unit 802 and DMD drive unit 803 and supplies each luminance signal to DMD drive unit 803. At this time, sequence generation unit 801, in accordance with the basic lighting timing signals, supplies each luminance signal adjusted to the lighting interval of the basic light source that emits the basic light of the color that is indicated in the luminance signal.

Light source drive unit 802 causes each of basic light sources 701-703 to light in accordance with the basic lighting timing signals from sequence generation unit 801. In this way, basic light sources 701-703 are sequentially lighted for each frame as shown in FIG. 15.

DMD drive unit 803, on the basis of basic lighting timing signals and each luminance signal from sequence generation unit 801, generates the first PWM signal for modulating each of the red light, green light, and blue light that are basic light and supplies the first PWM signal to DMD 708.

More specifically, DMD drive unit 803, on the basis of each luminance signal, finds the basic ON ratio that is the ON ratio of each micromirror of DMD 708 in the lighting intervals of each of basic light sources 701-703 within a one-frame interval and generates the first PWM signal according to the basic ON ratios. DMD drive unit 803 then applies the first PWM signal that corresponds to the color of light that is emitted by that basic light source as input to DMD 709 adjusted to the lighting interval of each basic light source that is indicated by the basic lighting timing signal, whereby DMD 709 modulates each basic light in accordance with the first PWM signal.

On the basis of the input picture signals, second control unit 820 calculates, for each pixel of an image indicated in the input picture signal, the specific color level that is the degree of similarity between the color of that pixel and the blue light that is the prescribed color and supplies a second PWM signal that accords with the specific color level of each pixel to DMD 709. More specifically, second control unit 820 includes: specific color level calculation unit 804, data generation unit 805, sequence generation unit 806, light source drive unit 807, and DMD drive unit 808.

On the basis of the input picture signals, specific color level calculation unit 804 calculates, for each pixel of the image indicated in the input picture signal, the specific color level that indicates the degree of similarity of the color of the pixel with respect to blue that is the prescribed color and supplies the specific color level signal that indicates the specific color level of each pixel and the input picture signals to data generation unit 805.

On the basis of the specific color level indicated by the specific color level signal from specific color level calculation unit 804 and the luminance value of blue-indicated by the input picture signal from specific color level calculation unit 804, data generation unit 805 determines the mixing amount that is the luminance value of the supplemental light in each pixel.

On the basis of the synchronizing signal of the input picture signal from data generation unit 805, sequence generation unit 806 generates a supplemental lighting timing signal that indicates the lighting interval in which green light source 704 is to be lighted. In the present exemplary embodiment, sequence generation unit 806 generates a supplemental lighting timing signal such that lighting interval 904 of green light source 704 is the same as lighting interval 903 of blue light source 703.

Sequence generation unit 806 then supplies the supplemental lighting timing signal to light source drive unit 807 and DMD drive unit 808 and supplies a mixing amount signal to DMD drive unit 808. At this time, sequence generation unit 806 supplies the mixing amount signal adjusted to the lighting interval of green light source 704 in accordance with the supplemental lighting timing signal.

Light source drive unit 807 causes lighting of green light source 704 in accordance with the supplemental lighting timing signal from sequence generation unit 806, whereby green light source 704 is lighted in the same lighting interval 904 as lighting interval 903 of blue light source 703, as shown in FIG. 15.

On the basis of the supplemental lighting timing signal and mixing amount signal from sequence generation unit 806, DMD drive unit 808 generates a second PWM signal that is the second modulation signal for modulating the green light that is the supplemental light and applies the second PWM signal as input to DMD 709.

More specifically, DMD drive unit 808 first, based on the mixing amount signal, finds the ON ratio of each micromirror of DMD 709 in the lighting interval of green light source 704 in a one-frame interval. At this time, DMD drive unit 408 increases the ON ratio in proportion to the size of the mixing amount.

DMD drive unit 808 next generates a second PWM signal that indicates the ON ratio of each micromirror of DMD 709 and applies this second PWM signal as input to DMD 709 adjusted to the lighting interval of green light source 704 that is indicated by the supplemental lighting timing signal. In this way, DMD 709 modulates the supplemental light in accordance with the specific color level of each pixel.

In the present exemplary embodiment, the method of finding the specific color level and mixing amount is identical to that of the first exemplary embodiment.

The operation of the projector of the present exemplary embodiment is next described.

Figure 16:
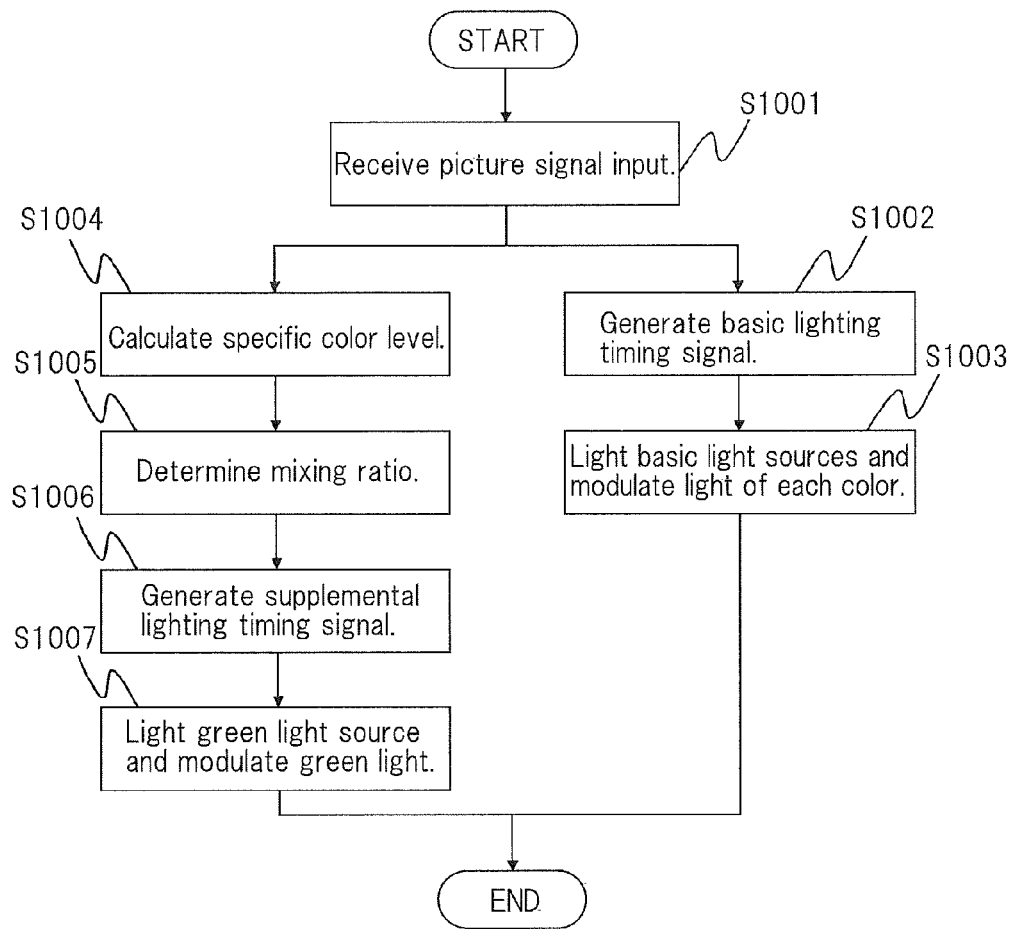
FIG. 16 is a flow chart for explaining an example of the operation of the control unit of the projector of the third exemplary embodiment of the present invention.

FIG. 16 is a flow chart for describing the operation of the control unit.

The input picture signal that is received from an outside device is first received in sequence generation unit 801 and specific color level calculation unit 804 (Step S1001). The input picture signal is assumed to contain a red signal, a green signal, and a blue signal that indicate the luminance of each of red, green, and blue. The following processes are executed for each frame of the input picture signal.

Sequence generation unit 801, on the basis of the synchronizing signal of the input picture signal, both generates a basic lighting timing signal and supplies the signal to light source drive unit 802 and DMD drive unit 803 and time-divides the input picture signal into a red signal, green signal, and blue signal in accordance with the basic lighting timing signal and supplies the result to DMD drive unit 803. At this time, sequence generation unit 801 supplies the red signal adjusted to lighting interval 901 of red light source 701 in FIG. 15, supplies the green signal adjusted to lighting interval 902 of green light source 702, and supplies blue signal adjusted to lighting interval 903 of blue light source 703 (Step S1002).

Light source drive unit 802 receives the basic lighting timing signal and causes lighting of basic light sources 701-703 in accordance with the basic lighting timing signal. On the other hand, DMD drive unit 803 receives the basic lighting timing signal, the red signal, the green signal, and the blue signal, and on the basis of the basic lighting timing signal, red signal, green signal, and blue signal, generates the first PWM signal and supplies the signal to DMD 709, whereby DMD 709 modulates each basic light beam in accordance with the first PWM signal (Step S1003).

On the other hand, on the basis of the input picture signal, specific color level calculation unit 804 calculates the specific color level for each pixel and generates a specific color level signal that indicates the specific color level of each pixel. Specific color level calculation unit 804 supplies the specific color level signal and input picture signal to data generation unit 805 (Step S1004).

Data generation unit 805 receives the specific color level signal and input picture signal, and on the basis of the specific color level signal, determines the mixing amount for each pixel of the image indicated in the input picture signal and generates the mixing amount signal of each pixel. Data generation unit 805 then supplies the mixing amount signal and input picture signal to sequence generation unit 806 (Step S1005).

Sequence generation unit 806 receives the mixing amount signal and input picture signal. On the basis of the synchronizing signal of the input picture signal, sequence generation unit 806 both generates the supplemental lighting timing signal and supplies the signal to light source drive unit 807 and DMD drive unit 808 and, in accordance with the supplemental lighting timing signal, supplies the mixing amount signal to DMD drive unit 808 adjusted to lighting interval 904 of green light source 704 in FIG. 15 (Step S1006).

Light source drive unit 807 receives the supplemental lighting timing signal and causes lighting of green light source 704 in accordance with the supplemental lighting timing signal. On the other hand, DMD drive unit 808 receives the supplemental lighting timing signal and mixing amount signal and on the basis of the supplemental lighting timing signal and mixing amount signal generates the second PWM signal and applies the signal to DMD 709, whereby DMD 709 modulates the green light from green light source 704 in accordance with the second PWM signal (Step S1007).

The operation of the optics shown in FIG. 14 is next described.

Basic light sources 701-703 (red light source 701, green light source 702, and blue light source 703) are controlled in a field sequential mode, and are therefore lighted in sequence. In this way, red light, green light, and blue light are emitted in sequence from basic light sources 701-703.

Light of each color from basic light sources 701-703 is emitted in the same direction by dichroic prism 705 and then reflected by prism 706 and irradiated into DMD 708. Light of each color is then modulated by DMD 708 in accordance with the first PWM signal and emitted in the direction of dichroic prism 710.

On the other hand, green light source 704 lights in the same interval as the lighting interval of blue light source 703 and emits green light. The green light from green light source 704 is reflected by prism 707 and irradiated into DMD 709. The green light is then modulated by DMD 709 in accordance with the second PWM signal and emitted in the direction of dichroic prism 710.

Dichroic prism 710 emits light of each color from DMD 709 and green light from DMD 709 in the same direction (specifically, the direction of the optical output of FIG. 3) by way of projection lens 112. At this time, blue light from DMD 709 and green light from DMD 709 reach dichroic prism 710 at the same time, and dichroic prism 710 combines this blue light and green light and emits the result.

In the present exemplary embodiment as described hereinabove as well, green light that is the supplemental light is modulated in accordance with the specific color level that indicates the degree of similarity of a color of a pixel with blue light, whereby it becomes possible to brighten the image by increasing the quantity of green light when the color of a pixel is in the vicinity of white, and further, it becomes possible to improve the color reproducibility by lowering the quantity of green light when the color of a pixel is in the vicinity of blue. Accordingly, color reproducibility can be improved while realizing a white image that has higher luminance.

The fourth exemplary embodiment of the present invention is next described.

In the first to third exemplary embodiments, the specific color level of the color of each pixel with respect to blue was calculated, but when green light is mixed in blue light, the possibility arises that the color reproducibility of magenta and cyan, which are mixed-light colors realized by mixing blue basic light and other basic light (red and green), may decrease. As a result, in the present exemplary embodiment, not only the specific color level with respect to the blue color of each pixel but also the specific color levels of the color of each pixel with respect to magenta and cyan are also calculated.

In the following explanation, the configuration of the projector in the present exemplary embodiment is assumed to be identical to that of the projector of the first exemplary embodiment that was shown in FIGS. 3 and 4, but similar operations are possible in the projectors of the second and third exemplary embodiments.

Specific color level calculation unit 201 further calculates, in addition to the blue specific color level $\Delta Bc$ of the color of each pixel, the magenta specific color level $\Delta Mc$ that is the specific color level with respect to magenta of the color of each pixel and the cyan specific color level $\Delta Cc$ that is the specific color level with respect to cyan of the color of each pixel.

For example, specific color level calculation unit 201 uses Formula 7 to calculate the magenta specific color level $\Delta Mc$.

[Formula 7]

$$\text{if } (R \geq B): \Delta Mc = \frac{pos(m1/2 - |H - 0|)}{m1/2} \times S \times V \quad \text{(Formula 7)}$$
$$\text{else: } \Delta Mc = \frac{pos(m1/2 - |H - 360|)}{m1/2} \times S \times V$$

Further, specific color level calculation unit 201 uses Formula 8 to calculate the cyan specific color level $\Delta Cc$.

[Formula 8]

$$\Delta Cc = \frac{pos(m1/2 - |H - 240|)}{m1/2} \times S \times V \quad \text{(Formula 8)}$$

In this case, data generation unit 202 determines mixing amount MG on the basis of the blue specific color level $\Delta Bc$, the magenta specific color level $\Delta Mc$, and the cyan specific color level $\Delta Cc$. More specifically, data generation unit 405 decreases the mixing amount in proportion to the magnitude of the sum total of blue specific color level $\Delta Bc$, magenta specific color level $\Delta Mc$, and cyan specific color level $\Delta Cc$.

For example, data generation unit 405 uses Formula 9 to calculate mixing amount MG.

[Formula 9]

$$MG=(1-(\Delta Bc+\Delta Mc+\Delta Cc))\times B \quad \text{(Formula 9)}$$

In the present exemplary embodiment, the specific color level with respect to the three colors blue, magenta, and cyan was calculated, but the specific color level may also be calculated with respect to the two colors blue and magenta or the two colors blue and cyan. When the specific color level with respect to the two colors blue and magenta is used, the mixing ratio can be calculated using Formula 10 in which the cyan specific color level $\Delta Cc$ is eliminated from Formula 9. Alternatively, when the specific color level with respect to the two colors blue and cyan is used, the mixing ratio can be calculated using Formula 11 in which the magenta specific color level $\Delta Mc$ is eliminated from Formula 9.

[Formula 10]

$$MG=(1-(\Delta Bc+\Delta Mc))\times B \quad \text{(Formula 10)}$$

$$MG=(1-(\Delta Bc+\Delta Mc))\times B \quad \text{(Formula 11)}$$

Further, the magenta specific color level $\Delta Mc$ and the cyan specific color level $\Delta Cc$ in the present exemplary embodiment are examples of other specific color levels.

According to the present exemplary embodiment, green light that is the supplemental light is modulated according to, not only the specific color level with respect to blue, but also the specific color level with respect to magenta or cyan, and as a result, greater accuracy can be achieved in producing white images that have both higher luminance and improved color reproducibility.

The configurations shown in the figures in each of the exemplary embodiments described hereinabove are merely examples, and the present invention is not limited to these configurations.

EXPLANATION OF REFERENCE NUMBERS 10 projector
11 light source unit
12 control unit
13 modulation unit
101, 701 red light source
102, 702, 704 green light source
103, 501 white light source
104, 502 color wheel
105-107, 503, 706, 707 prism
108-110, 504, 708, 709 DMD
111, 705, 710 dichroic prism
112, 711 projection lens
201, 804 specific color level calculation unit
202, 805 data generation unit
203, 601, 801, 806 sequence generation unit
204-206, 602, 803, 808 DMD drive unit
703 blue light source
802, 807 light source drive unit
810 first control unit
820 second control unit

What is claimed is:

1. A projector comprising:
a light source unit that emits a plurality of basic light beams of different colors and a supplemental light beam of the same color as any of the colors of said plurality of basic light beams;
a control unit that, on the basis of an input picture signal that is received as input, supplies as output a first modulating signal for modulating each basic light beam according to the color of each pixel of images indicated by said input picture signal and a second modulating signal for modulating said supplemental light beam according to, in each pixel, a specific color level that indicates the degree of similarity between the color of the pixel and, from among the colors of said plurality of basic light beams, a prescribed color, that differs from the color of said supplemental light beam; and
a modulation unit that modulates and emits each basic light beam according to said first modulating signal and modulates and emits said supplemental light beam in accordance with said second modulating signal.

2. The projector as set forth in claim 1, further comprising:
a projection optics unit that projects onto a projection surface each basic light beam and said supplemental light beam that were modulated in said modulation unit; wherein said control unit supplies for each pixel said second modulating signal such that the quantity of supplemental light that is projected from said projection optics for that pixel is reduced in proportion to the height of the specific color level corresponding to that pixel.

3. The projector as set forth in claim 2, wherein:
said modulation unit modulates said supplemental light by, for each said pixel, switching between an ON state in which said supplemental light is emitted in the direction of said projection optics unit and an OFF state in which said supplemental light is emitted in a direction other than said direction in accordance with said second modulating signal; and
said control unit, for each pixel, shortens the time interval in which the pixel is placed in said ON state in proportion to the height of the specific color level corresponding to that pixel.

4. The projector as set forth in claim 1, wherein said control unit determines said specific color level Δ1 from:

$$\Delta 1 = \frac{pos(m1/2 - |H - Hc1|)}{m1/2} \times S \times V \qquad \text{[Formula 1]}$$

where Δ1 is said specific color level, H is the hue of said pixel, S is the saturation, V is the brightness, Hc1 is the hue of said prescribed color, m1 is a value that indicates the range of hues in which said specific color level is calculated in said pixel, and the function pos(x) is a function whereby x is x when x is positive and 0 when x is not positive.

5. The projector as set forth in claim 1, wherein: said control unit holds a look-up table that indicates the correspondence relation between the color of said pixel and a specific color level of the color of the pixel that corresponds to said prescribed color and uses the look-up table to determine the specific color level of each pixel.

6. The projector as set forth in claim 1, wherein: said control unit, on the basis of said input picture signal, calculates for each said pixel another specific color level that indicates the degree of similarity between the color of that pixel and the color of mixed light realized by mixing basic light of said prescribed color with basic light of another color, and supplies said second modulating signal that accords with the specific color level and the other specific color level of each pixel.

7. The projector as set forth in claim 1, wherein:
said input picture signal represents the color of each pixel according to the luminance values of a plurality of colors that include the luminance value of said prescribed color; and
said control unit, on the basis of the specific color level of each pixel and the luminance value of a prescribed color of each pixel that is indicated by said input picture signal, determines a mixing amount that is the luminance value of said supplemental light and supplies said second modulating signal that accords with said mixing amount.

8. The projector as set forth in claim 7, wherein:
said control unit determines said mixing amount MG from:

$$MG = (1 - \Delta 1) \times X \qquad \text{[Formula 2]}$$

where Δ1 is said specific color level, and X is the luminance value of said prescribed color.

9. The projector as set forth in claim 7, wherein said control unit holds a look-up table that indicates the correspondence relation between said specific color level and said mixing amount and uses the look-up table to determine said mixing amount.

10. A color correction device used in a projector and provided with: a light source unit that emits a plurality of basic light beams of different colors and a supplemental light beam of the same color as any of the colors of said plurality of basic light beams, and a modulation unit that modulates and emits each basic light beam in accordance with a first modulating signal for modulating each basic light beam and modulates and emits said supplemental light beam in accordance with a second modulating signal for modulating said supplemental light beam; said color correction device comprising:
    a control unit that, on the basis of an input picture signal that is received, supplies as output said first modulating signal that accords with the color of each pixel of an image indicated in said input picture signal and said second modulating signal that accords with a specific color level that indicates in each pixel the degree of similarity between the color of the pixel and, among the colors of said plurality of basic light beams, a prescribed color that differs from the color of said supplemental light beam.

11. A projection method comprising:
emitting a plurality of basic light beams of different colors and a supplemental light beam of the same color as any of the colors of said plurality of basic light beams;
on the basis of on an input picture signal that is received, supplying as output a first modulating signal for modulating each basic light beam that accords with the color of each pixel of an image that is indicated in said input picture signal and a second modulating signal for modulating said supplemental light beam that accords with a specific color level that indicates, in each pixel, the degree of similarity between the color of the pixel and, of the colors of said plurality of basic light beams, a prescribed color that differs from the color of said supplemental light beam; and
modulating and emitting each of the basic light beams in accordance with said first modulating signal and modulating and emitting said supplemental light beam in accordance with said second modulating signal.

* * * * *